(12) United States Patent
Depner et al.

(10) Patent No.: US 12,509,308 B2
(45) Date of Patent: Dec. 30, 2025

(54) DEVICE FOR TRANSPORTING CONTAINERS AND METHOD FOR OPERATING THE DEVICE

(71) Applicant: Krones AG, Neutraubling (DE)

(72) Inventors: Christian Depner, Silberstedt (DE); Jens Luecke, Flensburg (DE); Niels Clausen, Dollerup (DE)

(73) Assignee: KRONES AG, Neutraubling (DE)

( * ) Notice: Subject to any disclaimer, the term of this patent is extended or adjusted under 35 U.S.C. 154(b) by 67 days.

(21) Appl. No.: 18/595,127

(22) Filed: Mar. 4, 2024

(65) Prior Publication Data

US 2024/0300748 A1 Sep. 12, 2024

(30) Foreign Application Priority Data

Mar. 7, 2023 (DE) .......................... 102023105654.9

(51) Int. Cl.
*B65G 47/68* (2006.01)
*B65G 47/76* (2006.01)

(52) U.S. Cl.
CPC ............ *B65G 47/68* (2013.01); *B65G 47/76* (2013.01); *B65G 2047/687* (2013.01); *B65G 2201/0244* (2013.01)

(58) Field of Classification Search
CPC .. B65G 47/683; B65G 47/684; B65G 47/763; B65G 2047/687; B65G 2201/0244; A23L 3/04; A23L 3/001
See application file for complete search history.

(56) References Cited

U.S. PATENT DOCUMENTS 3,104,753 A 9/1963 Osborne
3,232,411 A * 2/1966 Kulig ................... B65G 47/684
198/446

(Continued)

FOREIGN PATENT DOCUMENTS

DE 3340088 A1 8/1985
DE 3715577 A1 11/1988
(Continued)

OTHER PUBLICATIONS

European Patent Office, Extended European Search Report Issued in Application No. 24150232.7, Jun. 13, 2024, Germany, 22 pages.

*Primary Examiner* — James R Bidwell
(74) *Attorney, Agent, or Firm* — McCoy Russell LLP

(57) ABSTRACT

The disclosure relates to a device for transporting containers, having: at least one first conveyor belt whose transport surface encloses a first angle with a plane perpendicular to the direction of action of gravity, the first transport surface extending in the transverse direction, containers being transportable in a first or in a second direction that are opposite to each another and extend in the transverse direction; a main conveyor belt having a second transport surface, wherein, in a first region adjacent to the at least one first conveyor belt, the second transport surface encloses the first angle with the plane perpendicular to the direction of action of gravity and extends in the longitudinal direction, containers are transportable in a third or fourth direction that are opposite to each other and extend in the longitudinal direction, wherein the third and fourth directions are perpendicular to the first and second directions, respectively.

20 Claims, 2 Drawing Sheets

(56) References Cited

U.S. PATENT DOCUMENTS

| | | | | |
|---|---|---|---|---|
| 3,650,371 | A | * | 3/1972 | Constable ............ B65G 47/683 |
| | | | | 198/347.4 |
| 3,980,174 | A | | 9/1976 | Conrad |
| 4,843,799 | A | | 7/1989 | Simelunas et al. |
| 6,964,329 | B1 | * | 11/2005 | DiBianca ................ B65G 51/03 |
| | | | | 198/347.1 |
| 7,322,459 | B2 | * | 1/2008 | Garvey ................ B65G 47/684 |
| | | | | 198/623 |
| 10,766,704 | B2 | | 9/2020 | Knopp |
| 2024/0034571 | A1 | | 2/2024 | Depner et al. |

FOREIGN PATENT DOCUMENTS

| | | | |
|---|---|---|---|
| DE | 3340088 C2 * | 9/1993 | ........... B65G 47/683 |
| DE | 102020134232 A1 | 6/2022 | |
| EP | 3623321 A1 | 3/2020 | |
| FR | 2607123 A1 | 5/1988 | |
| GB | 623482 A | 5/1949 | |
| WO | 2011091792 A1 | 8/2011 | |
| WO | 2022129354 A1 | 6/2022 | |
| WO | WO-2023089168 A1 * | 5/2023 | ........... B65G 47/682 |

* cited by examiner

DEVICE FOR TRANSPORTING CONTAINERS AND METHOD FOR OPERATING THE DEVICE

CROSS REFERENCE TO RELATED APPLICATION

The present application claims priority to German Patent Application No. 10 2023 105 654.9 filed on Mar. 7, 2023. The entire contents of the above-listed application are hereby incorporated by reference for all purposes.

TECHNICAL FIELD

The disclosure relates to a method for transporting containers and to a method for operating the device as described herein.

BACKGROUND

In order to enable a transfer of parallel, incoming transporters onto a mass flow conveyor to be carried out at a defined angle without damage to the containers, it is known to tilt the incoming transporters in the direction of the mass flow conveyor. There is usually a transfer region between the incoming transporters and the mass flow conveyor. This transfer region is generally kept as small as possible and can be equipped with transfer plates.

The incoming transporters run in a first, tilted plane, and the mass flow conveyor can run in a horizontal plane.

The line of intersection of the two planes is located in the transfer region between the incoming transporters and the mass flow conveyor. In the transfer region, the containers are deflected by a defined angle (generally by 90°). Due to the inclination of the incoming transporters in the direction of the mass flow conveyor, the containers can be transferred more easily with the aid of their weight.

The bend between the two planes is located in the transition region, so that there the containers can generally no longer contact each other at the full height of the body region, but only in the head region.

SUMMARY

The contact in the head region in conjunction with the transverse thrust of the incoming conveyor belts/mass flow conveyor can cause containers to fall over more frequently, meaning that any fill-level that is to be achieved cannot be reached.

The object of the disclosure is to provide a device for transporting containers, and a method for operating the device, which can enable secure transport of containers even in the event of a change of direction.

The object is achieved by the device for transporting containers and the method for operating the device as described herein.

The device for transporting containers, such as upright containers, such as bottles, comprises at least one first conveyor belt which comprises a first transport surface which encloses a first angle with a plane perpendicular to the direction of action of gravity, wherein the first transport surface extends in the transverse direction, which is designed to transport containers in a first direction or in a second direction. The first direction and the second direction are opposite to one another. The first direction and the second direction extend in the transverse direction.

The device further comprises a main conveyor belt having a second transport surface, wherein, in a first region, which is subsequently arranged on the at least one first conveyor belt, the second transport surface encloses the first angle with the plane perpendicular to the direction of action of gravity, wherein the second transport surface extends in the longitudinal direction. Containers can be transported in the first region in a third or fourth direction, wherein the third and fourth directions are opposite each other. The third and the fourth directions extend in the longitudinal direction. The third and fourth directions are perpendicular to the first and second directions, respectively.

In a second region which adjoins the first region, the second transport surface encloses a second angle of 0° with the plane perpendicular to the direction of action of gravity. Containers can be transported in a fifth or sixth direction in the second region. The fifth and sixth directions are opposite to one another. The fifth and sixth directions are perpendicular to the first and second directions, respectively.

The transverse direction can be synonymous with a slope-parallel course.

The second transport surface extends perpendicular to the direction of action of gravity, i.e., it extends horizontally.

The first, third, and fifth directions or the second, fourth, and sixth directions can be provided for a transport of containers by the device. In the first case, containers can be transferred from the at least one first conveyor belt to the main conveyor belt, and, in the second case, from the main conveyor belt to the at least one conveyor belt.

The device allows the transition from the first to the second angle to come to rest on the main conveyor belt. In this way, the effects of the transverse thrust on the containers, when changing direction from the at least one first conveyor belt to the main conveyor belt (first to third direction) or main conveyor belt to the at least one first conveyor belt (fourth to second direction), and the effects of the angular change on the containers can be spatially separated.

If there is more than one first conveyor belt, the first transport surfaces can be arranged without steps in adjacent regions. The individual first transport surfaces can enclose the first angle with the plane perpendicular to the direction of action of gravity. The main conveyor belt can then connect to the last one of the several first conveyor belts.

The device can comprise one or more rails that can guide containers from the at least one first conveyor belt to the main conveyor belt or vice versa.

The first angle can comprise a range of 0.1° to 30°—for example, of 15° to 20°.

A third region in which a continuous transition from the first angle to the second angle can take place can be included between the first region and the second region.

The continuous transition can result from the main conveyor belt itself, which can comprise an inherent weight and, for example, a given material stiffness.

In the edge regions of the main conveyor belt, two or more first hold-down devices can be provided in a transition region between the first region and the second region. The main conveyor belt can be held down by means of the first hold-down device in order to ensure a transition from the first to the second angle. This can be expedient, for example, if vibrations can occur in the main conveyor belt without a first hold-down device. The transition region can be the third region or can comprise the third region.

The main conveyor belt can comprise a groove on an underside of the second transport surface. For example, a second hold-down device can be provided on a substructure of the main conveyor belt in a/the transition region between the first region and the second region, which second hold-down device can be arranged for example in the groove. The main conveyor belt can be held down by means of the second hold-down device in order to ensure a transition from the first to the second angle. This can be expedient, for example, if vibrations can occur in the main conveyor belt without the second hold-down device. The transition region can include the third region or can be the third region.

The first angle of the first transport surface can be adjustable by means of a first motor drive—for example, mechanically and/or hydraulically. For example, a first sensor system can be provided for detecting the first angle of the first transport surface.

The first angle of the first region of the second transport surface can be adjustable by means of a second motor drive—for example, mechanically and/or hydraulically. For example, a second sensor system can be provided for detecting the first angle of the first region of the second transport surface.

A first length of the first region and, correspondingly depending thereupon, a second length of the second region can be adjustable. The length of the third region can be taken into account. The lengths can each be measurable along the transport surface. The total length of the first transport surface can be taken into account here.

A first length of the first region can be in a range of 0.2 meters to 3 meters—for example, in a range of 0.4 meters to 2 meters. When selecting the first length, it can be taken into account that a pressure due to containers being pushed along in the region between the at least one conveyor belt and the main conveyor belt can be sufficiently high that the action of this pressure can extend into the second region on the main conveyor belt, and a maximum fill-level of containers can be achieved there.

The main conveyor belt can have a width of 3 to 8 meters—for example, a width of 5 meters to 7 meters. The range limits can be included. The main conveyor belt can also have a smaller or a greater width than the widths specified above.

A transfer plate can be provided between the at least one first conveyor belt and the main conveyor belt.

In the presence of several first conveyor belts, the transfer plate can be provided between the last of the first conveyor belts and the main conveyor belt.

The transfer plate can enclose the first angle with the plane perpendicular to the direction of action of gravity. Because the transfer plate is static (the containers are not actively moved), it is not necessary to specify whether it extends in the longitudinal or transverse direction.

For example, the transfer plate can comprise a fourth region for receiving containers from the at least one first conveyor belt and a fifth region for transferring received containers to the main conveyor belt, wherein the fifth region can be designed as a sealing element.

The sealing element can prevent foreign matter, such as fragments of containers, e.g., glass shards, and/or unwanted foreign bodies, e.g., dirt, and/or product residues, from entering a possible gap or space between the transfer plate and the main conveyor belt.

The fifth region, designed as a sealing element, of the transfer plate can thus be designed to prevent penetration of the aforementioned foreign material into a drive mechanism of the main conveyor belt and/or of the at least one first conveyor belt.

For example, the fifth region formed as a sealing element can comprise an overhang which can lie at least partially on or above the main conveyor belt and can comprise at least one groove, wherein the at least one groove can be designed to receive a part of the main conveyor belt.

For example, the transfer plate can have a length of 0.2 meters to 0.3 meters.

"Transfer plate" can be understood to mean any flat, non-moving transfer surface. For example, this can be a metal sheet, a non-movable conveyor belt, or a mat chain. For example, an SCT conveyor belt can be provided that does not move. Other materials or material combinations are also conceivable. For example, a width of the transfer plate can correspond to a width of the main conveyor belt.

The main conveyor belt can comprise a buffer belt, a mass conveyor, or a pasteurizer.

A method of operating the device, as described above or below, can be provided.

The method can comprise transporting containers in the first direction by means of the at least one first conveyor belt and transporting containers in the third and fifth directions by means of the main conveyor belt.

Alternatively, the method can comprise transporting containers in the sixth and fourth directions by means of the main conveyor belt and transporting containers in the second direction by means of the at least one first conveyor belt.

The method can comprise adjusting the first angle—for example, adjusting the first angle of the first transport surface and the first angle of the second transport surface.

The method can comprise adjusting a first length of the first region and, correspondingly depending thereupon, a second length of the second region.

BRIEF DESCRIPTION OF FIGURES

The accompanying figures show, by way of example, aspects and/or exemplary embodiments of the disclosure for better understanding and illustration. In the figures.

DETAILED DESCRIPTION OF FIGURES

Figure 1:
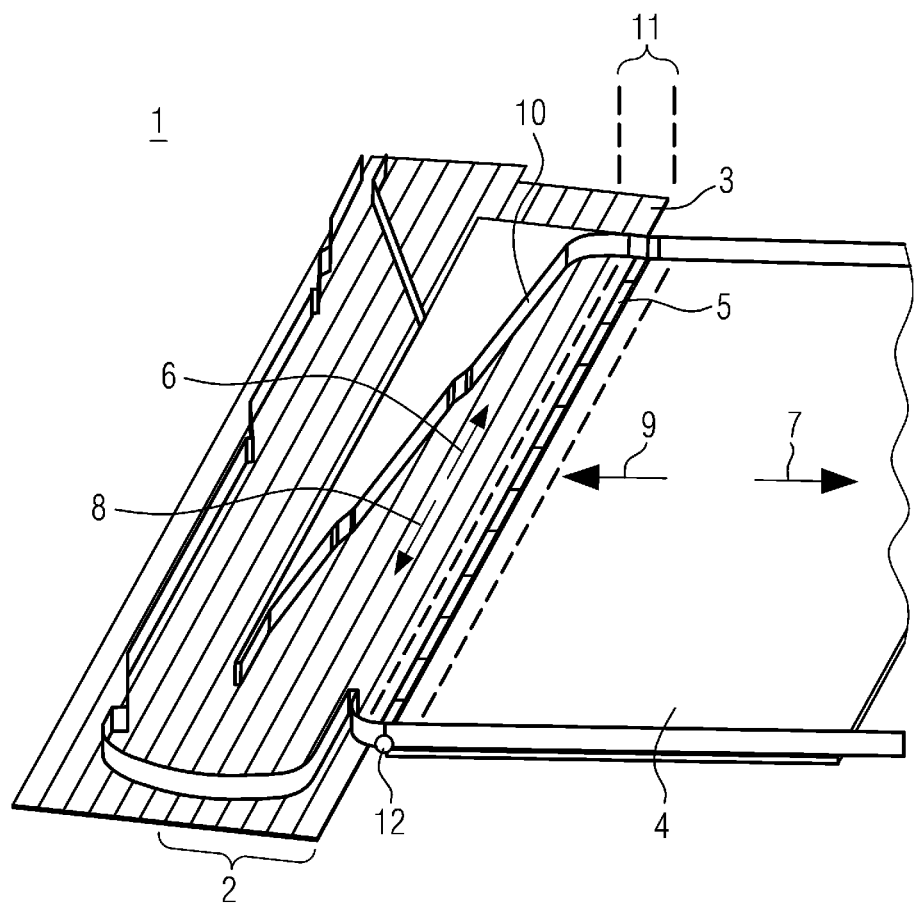
FIG. 1 is an oblique view from above of a transport device of the prior art for containers.

FIG. 1 shows an oblique view from above of a transport device 1 of the prior art for containers. The transport device 1 comprises six conveyor belts 2 which are designed to transport containers in a first direction 6 or in a second direction 8, wherein the first direction 6 and the second direction 8 are opposite to one another. The transport surfaces of the six conveyor belts 2 enclose a first angle, which is not equal to zero (see also FIG. 2), with a plane perpendicular to the direction of action of gravity. The transport surfaces, as well as the first and second directions 6, 8, extend in the transverse direction.

During transport in the first direction 6, containers on the conveyor belts 2 can encounter a railing 10 which can guide them in the direction towards a main conveyor belt 4. A transfer plate 5 is provided following the last conveyor belt 3. The transfer plate 5 can enclose the first angle with the plane perpendicular to the direction of action of gravity. The main conveyor belt 4 is arranged horizontally and is designed to transport containers in a third direction 7 or in a fourth direction 9.

The intersection line 12 of the plane tilted by the first angle and the horizontal is located in a transfer region 11 between the conveyor belts 2 and the main conveyor belt 4. In the transfer region 11, containers are deflected by an angle of 90°. Due to the inclination of the transport belts 2 in the direction of the main conveyor belt 4, the containers can be pushed over more easily with the aid of their weight—for example, by containers pushing them along.

In the transition region 11, the line of intersection between the tilted plane and the horizontal is situated such that containers can generally no longer contact one another there at the entire height of the body region, but, rather, only in the head region. The contact in the head region in conjunction with the transverse thrust of the conveyor belts 2 and the main conveyor belt 4 can result in more containers falling over. It may therefore happen that a fill-level to be achieved cannot be reached.

Figure 2:
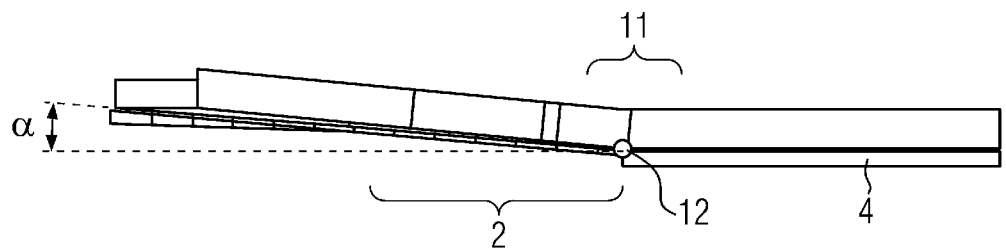
FIG. 2 is a side view of the transport device of FIG. 1 viewed in the first direction.

FIG. 2 shows a side view of the transport device 1 of FIG. 1, viewed in the first direction 6. It can be seen that the transport surfaces of the six conveyor belts 2 enclose the angle α with the plane perpendicular to the direction of action of gravity, and that the main conveyor belt 4 is arranged horizontally.

Figure 3:
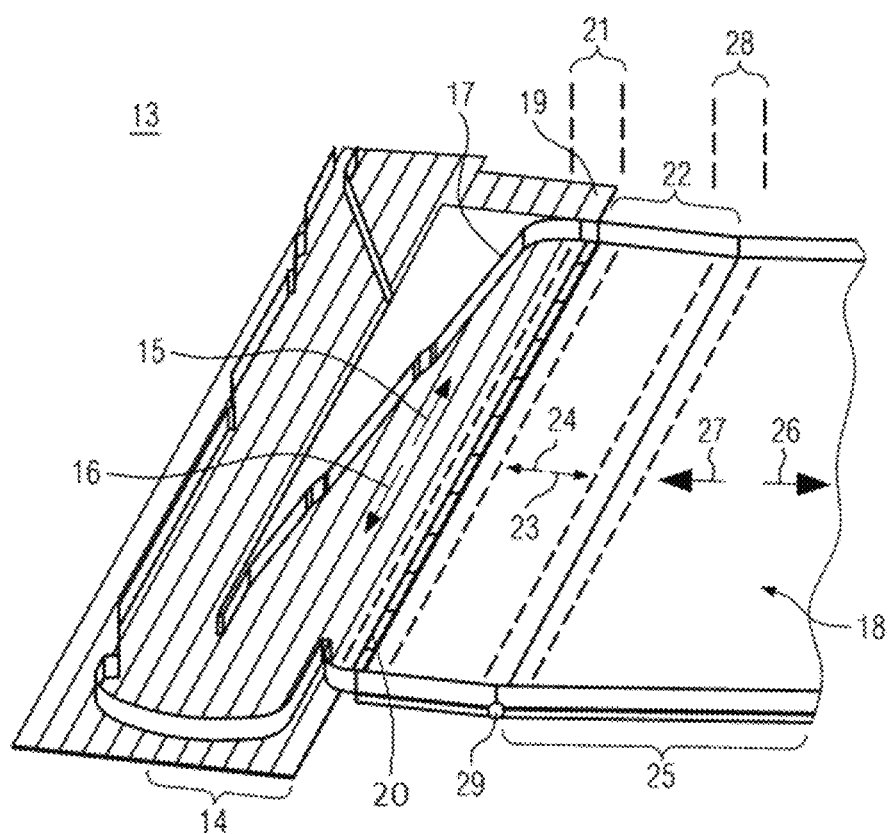
FIG. 3 is an oblique view from above of a device for transporting containers.

FIG. 3 shows an oblique view from above of a device 13 for transporting containers—for example, upright containers such as bottles. In the illustration, the device 13 comprises six first conveyor belts 14 which are designed to transport containers in a first direction 15 or in a second direction 16. The first direction 15 and the second direction 16 are opposite to one another. The first transport surfaces of the first conveyor belts 14 enclose a first angle with a plane perpendicular to the direction of action of gravity (see FIG. 4). The first transport surfaces, and thus the first direction 15 and the second direction 16, extend in the transverse direction.

During transport in the first direction 15, containers on the conveyor belts 14 can encounter a railing 17 which can guide them in the direction towards a main conveyor belt 18. A transfer plate 20 is provided following the last conveyor belt 19 of the six first conveyor belts 14. The transfer plate 20 can enclose the first angle with the plane perpendicular to the direction of action of gravity.

In a transfer region 21 between the first conveyor belts 14 and the main conveyor belt 18, containers are deflected by an angle of 90°. Due to the inclination of the first transport belts 14 in the direction of the main conveyor belt 18, the containers can be pushed over more easily with the aid of their weight—for example, by containers pushing them along.

Furthermore, the device 13 comprises the main conveyor belt 18 having a second transport surface. In a first region 22 of the main conveyor belt 18, which is arranged adjacent to the last first conveyor belt 19 or the transfer plate 21, the second transport surface encloses the first angle with the plane perpendicular to the direction of action of gravity. The second transport surface extends in the longitudinal direction. Containers can be transported in the first region 22 in a third direction 23 or in a fourth direction 24, wherein the third and fourth directions 23, 24 are opposite each other and each extend in the longitudinal direction. The third and fourth directions 23, 24 are perpendicular to the first and second directions 15, 16, respectively.

In a second region 25 of the main conveyor belt 18, which adjoins the first region 22, the second transport surface encloses a second angle of 0° with the plane perpendicular to the direction of action of gravity. The second transport surface thus extends horizontally. Containers can be transported in a fifth direction 26 or in a sixth direction 27 in the second region 25. The fifth and sixth directions 26, 27 are opposite each other and are perpendicular to the first and second directions 15, 16, respectively.

The first, third, and fifth directions 15, 23, 26, or the second, fourth, and sixth directions 16, 24, 27, can be provided for a transport of containers by the device 13. In the first case, containers can be transferred from the first conveyor belts 14 to the main conveyor belt 18 via the transfer plate 20 and, in the second case, from the main conveyor belt 18 to the first conveyor belts 14 via the transfer plate 20.

The device 13 enables a transition 28 from the first angle to the horizontal (second angle) to come to rest on the main conveyor belt 18. The intersection line 29 of the plane tilted by the first angle and the horizontal is situated in the transition 28. Thus, the effects of the transverse thrust on the containers during the change of direction in the transition region 21 from the first conveyor belts 14 or from the last conveyor belt 19 of the first conveyor belts 14 to the main conveyor belt 18, and the effects of the change of angle in the transition 28 on the containers, can be spatially separated.

Figure 4:
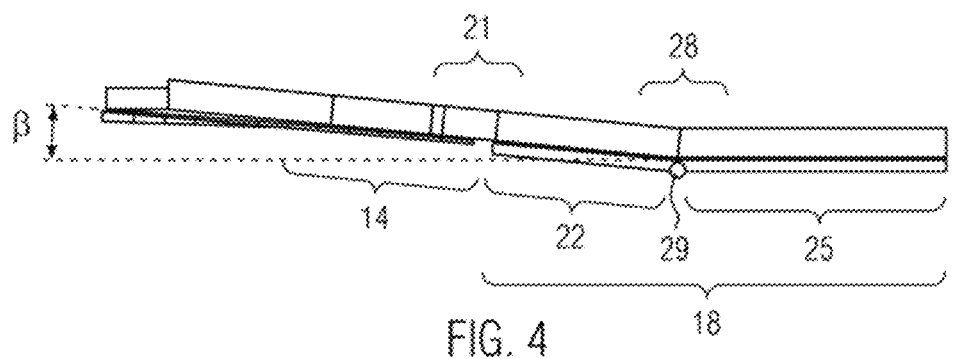
FIG. 4 is a side view of the device of FIG. 3 viewed in the first direction.

FIG. 4 shows a side view of the device 13 of FIG. 3, viewed in the first direction 15. It can be seen that the transport surfaces of the six first conveyor belts 14 and the first region 22 of the main conveyor belt 18 enclose the angle β with the plane perpendicular to the direction of action of gravity, and that the second region 25 of the main conveyor belt 18 is arranged horizontally.

The invention claimed is:

1. Device for transporting containers, wherein the device comprises:
   at least one first conveyor belt,
   which comprises a first transport surface which encloses a first angle with a plane perpendicular to the direction of action of gravity, wherein the first transport surface extends in the transverse direction,
   which is designed to transport containers in a first direction, wherein the first direction extends in the transverse direction,
   a main conveyor belt having a second transport surface,
   wherein, in a first region which is arranged adjacent to the at least one first conveyor belt,
   the second transport surface encloses the first angle with the plane perpendicular to the direction of action of gravity, wherein the second transport surface extends in a longitudinal direction,
   containers can be transported in a second direction, wherein the second direction extends in the longitudinal direction, wherein the second direction is perpendicular to the first directions,
   wherein, in a second region which adjoins the first region, the second transport surface encloses a second angle of 0° with the plane perpendicular to the direction of action of gravity,
   containers can be transported in a third direction, wherein the third direction is perpendicular to the first direction,
   wherein containers can be transferred from the at least one first conveyor belt to the main conveyor belt.

2. Device according to claim 1, wherein the first angle comprises a range of 0.1° to 30°.

3. Device according to claim 1, wherein a third region is included between the first region and the second region, in which third region a continuous transition takes place from the first angle to the second angle.

4. Device according to claim 1, wherein, in edge regions of the main conveyor belt, two or more first hold-down devices are provided in a transition region between the first region and the second region.

5. Device according to claim 1, wherein the main conveyor belt comprises a groove on an underside of the second transport surface.

6. Device according to claim 1, wherein the first angle of the first transport surface can be adjusted by a first motor drive, e.g., mechanically and/or hydraulically, wherein a first sensor system is provided for detecting the first angle of the first transport surface.

7. Device according to claim 1, wherein the first angle of the first region of the second transport surface is adjustable by means of a second motor drive.

8. Device according to claim 1, wherein a first length of the first region and, correspondingly dependent thereupon, a second length of the second region is adjustable.

9. Device according to claim 1, wherein a first length of the first region is in a range of 0.2 meters to 3 meters.

10. Device according to claim 1, wherein the main conveyor belt has a width of 3 meters to 8 meters.

11. Device according to claim 1, wherein a transfer plate is provided between the at least one first conveyor belt and the main conveyor belt, which plate encloses the first angle with the plane perpendicular to the direction of action of gravity.

12. Device according to claim 1, wherein the main conveyor belt comprises a buffer belt, a mass conveyor, or a pasteurizer.

13. Device according to claim 5, wherein a second hold-down device is provided on a substructure of the main conveyor belt in a transition region between the first region and the second region, which second hold-down device can be arranged in the groove.

14. Device according to claim 6, wherein a second sensor system is provided for detecting the first angle of the first region of the second transport surface.

15. Device according to claim 11, wherein the transfer plate comprises a fourth region for receiving containers from the at least one first conveyor belt and a fifth region for transferring received containers to the main conveyor belt, wherein the fifth region is designed as a sealing element, wherein, the fifth region designed as a sealing element comprises an overhang which lies at least partially on or above the main conveyor belt and comprises at least one groove, wherein the at least one groove is designed to receive a part of the main conveyor belt.

16. Device according to claim 15, wherein, the transfer plate has a length of 0.2 meters to 0.3 meters.

17. Device according to claim 15, wherein, a width of the transfer plate corresponds to a width of the main conveyor belt.

18. Method for operating the device according to claim 1.

19. Device according to claim 1, wherein the containers are upright containers such as bottles.

20. Device according to claim 6, wherein the first angle of the first transport surface can be adjusted mechanically and/or hydraulically by the first motor drive.

* * * * *